US 6,727,307 B2

(12) United States Patent
Kondo et al.

(10) Patent No.: US 6,727,307 B2
(45) Date of Patent: Apr. 27, 2004

(54) RUBBER COMPOSITION

(75) Inventors: Hajime Kondo, Kodaira (JP);
Kazuhiro Yanagisawa, Kodaira (JP);
Tomohisa Konno, Chuo-Ku (JP);
Yoshiyuki Udagawa, Chuo-Ku (JP);
Toshihiro Tadaki, Chuo-Ku (JP)

(73) Assignees: Bridgestone Corporation, Tokyo (JP);
JSR Corporation, Tokyo (JP)

( * ) Notice: Subject to any disclaimer, the term of this patent is extended or adjusted under 35 U.S.C. 154(b) by 166 days.

(21) Appl. No.: 10/024,549

(22) Filed: Dec. 21, 2001

(65) Prior Publication Data

US 2002/156169 A1 Oct. 24, 2002

(30) Foreign Application Priority Data

Dec. 27, 2000 (JP) ......................... 2000-399156

(51) Int. Cl.[7] .................................. C08J 5/10

(52) U.S. Cl. .................. 524/430; 524/432; 524/433; 524/444; 524/451; 524/492; 524/571; 524/572

(58) Field of Search ................. 524/572, 571, 524/492, 432, 430, 433, 444, 451

(56) References Cited

U.S. PATENT DOCUMENTS

| 5,807,941 A | * | 9/1998 | Tsuji et al. ............... 526/224 |
| 6,075,092 A | * | 6/2000 | Nakamura et al. .......... 525/122 |
| 6,262,161 B1 | * | 7/2001 | Betso et al. ................ 524/425 |
| 6,465,579 B1 | * | 10/2002 | Chino et al. ............. 525/326.5 |

FOREIGN PATENT DOCUMENTS

| DE | 196 43 035 A1 | 4/1998 |
| EP | 661298 * | 7/1995 |
| EP | 0 661 298 A2 | 7/1995 |
| JP | 60-108443 | 6/1985 |
| JP | 63-137939 | 6/1988 |
| JP | 4-332701 | 11/1992 |

* cited by examiner

Primary Examiner—David W. Wu
Assistant Examiner—Henry S. Hu
(74) Attorney, Agent, or Firm—Sughrue Mion, PLLC

(57) ABSTRACT

A rubber composition comprises a polar group-containing diene polymer synthesized through an emulsion polymerization as a rubber component, and an inorganic filler represented by a formula of $mM \cdot xSiO_y \cdot zH_2O$ wherein M is a metal selected from the group consisting of aluminum, magnesium, titanium and calcium, an oxide or a hydroxide of such a metal or an hydrate thereof, m is an integer of 1 to 5, x is an integer of 0 to 10, y is an integer of 2 to 5 and z is an integer of 0 to 10.

7 Claims, No Drawings

RUBBER COMPOSITION

BACKGROUND OF THE INVENTION

1. Field of the Invention

This invention relates to a rubber composition, and more particularly to a rubber composition having excellent fracture properties and wear resistance by using a polar group-containing diene polymer which is obtained through an emulsion polymerization and has an enhanced interaction with an inorganic filler such as aluminum hydroxide or the like.

2. Description of Related Art

Heretofore, carbon black is frequently used as a filler for the reinforcement of a rubber composition. Because, carbon black can provide a high reinforcing property and an excellent wear resistance as compared with other fillers.

On the other hand, it is attempted to reduce a hysteresis loss property of rubber in a tire, and hence a rolling resistance of the tire, for saving a fuel consumption of a vehicle accompanied with a social demand for recent energy-saving. In this case, it is considered to decrease an amount of carbon black filled or to use carbon black having a larger particle size. In any case, however, it is known that the lowering of the reinforcing property, wear resistance or gripping property on a wet road surface is irremissible.

Furthermore, silica is known as a filler simultaneously establishing the low hysteresis loss property, reinforcing property, wear resistance and gripping property on a wet road surface, which is proposed, for example, in JP-A-3-252431, JP-A-6-248116, JP-A-7-70369, JP-A-7-188466, JP-A-7-196850, JP-A-8-225684, JP-A-8-245838, JP-A-8-337687 and so on.

However, silica has a drawback that the running performances on a dry road surface are poor as compared with those of a carbon black having approximately the same specific surface area because a storage modulus of a rubber composition compounded with silica is small. In order to enhance the storage modulus, therefore, it is known to increase an amount of silica filled or a specific surface area of silica. In this case, however, it is a problem to lower the low hysteresis loss property inherent to the use of silica And also, it is known to be effective to heighten a glass transition temperature (Tg) of rubber or tan δ at 0° C. as means for improving the gripping property on the wet road surface. However, as the Tg of rubber heightens, performances at lower temperatures degrade and the rolling resistance increases and hence there is caused a problem of degrading the low fuel consumption.

In order to solve these problems, there are disclosed various techniques, for example, (1) a rubber composition for a tire tread improving a gripping property on a wet road surface with a special silica and a devised milling (EP0501227B), (2) a rubber composition for a tire tread holding a low hysteresis loss property and an improved wet skid performance without degrading a processability and a wear resistance (JP-A-7-149950), (3) a rubber composition for a tire tread improving a gripping property on a wet road surface or a semi-wet road surface at lower and higher temperature zones and a processability (JP-A-8-59893), (4) a rubber composition for a tire tread improving a gripping property on a wet road surface or a semi-wet road surface at lower and higher temperature zones without degrading a wear resistance (JP-A-8-59894) and the like.

However, the rubber composition of the above item (1) has a problem in the processability (workability), and the rubber composition of the above item (2) can not be said to be sufficient in the wear resistance. And also, the rubber compositions of the above items (3) and (4) have a problem that a quantity of a reinforcing filler compounded is too large.

On the other hand, inorganic fillers are known as a reinforcing filler for rubber (JP-A-8-59893, JP-A-8-59894, JP-A-9-151276, JP-A-11-334310, JP-A-2000-80204 and so on). When a tire tread is formed by using a rubber composition containing such an inorganic filler, wet performances such as a gripping property on a wet road surface and the like are good and a low fuel consumption is attained, but fracture properties and wear resistance are poor. Therefore, an amount of the inorganic filler used is naturally critical, and also the effect by adding a silane coupling agent is not sufficiently obtained.

In order to obtain a rubber composition having a low hysteresis loss property, there are developed many techniques of enhancing a dispersibility of a filler used in a rubber composition. Among them, a method of modifying a living end of a diene polymer obtained by an anionic polymerization using an organic lithium compound with a functional group having an interaction with a filler becomes most generic.

For instance, a rubber composition containing silica as a reinforcing filler and a rubber component obtained by modifying a living end of a diene polymer obtained through an anionic polymerization with a silicon compound having an alkoxyl group is disclosed in JP-B-6-57767, JP-A-7-233216, JP-A-9-87426 and the like. Even in such a rubber composition, however, all of the wet performances, low fuel consumption property and wear resistance can not be always satisfied sufficiently under the present circumstances.

SUMMARY OF THE INVENTION

Under the above situation, the invention is to solve the aforementioned problems of the conventional techniques and to provide a rubber composition simultaneously establishing the wet performances, low fuel consumption property, fracture properties, wear resistance and the like by using a diene polymer having a polar group in its molecule as a rubber component, and an inorganic filler.

The inventors have made various studies in order to achieve the above object and aimed at good wet performances and low fuel consumption developed, by an inorganic filler such as aluminum hydroxide or the like, and found that the above object can be achieved with a rubber composition using an inorganic filler such as aluminum hydroxide or the like and, if necessary, carbon black or silica as a reinforcing filler, and a specified polar group-containing diene polymer having an interaction enhanced to such a reinforcing filler as a rubber component and as a result, the invention has been accomplished.

According to the invention, there is the provision of a rubber composition comprising a diene polymer synthesized through an emulsion polymerization and having a polar group in its molecule as a rubber component, and an inorganic filler represented by the following formula (1)

$$mM \cdot xSiO_y \cdot zH_2O \qquad (1)$$

wherein M is a metal selected from the group consisting of aluminum, magnesium, titanium and calcium, an oxide or a hydroxide of such a metal or a hydrate thereof, m is an integer of 1 to 5, x is an integer of 0 to 10, y is an integer of 2 to 5 and z is an integer of 0 to 10.

In a preferable embodiment of the invention, the polar group is at least one selected from the group consisting of hydroxyl group, alkoxysilyl group, epoxy group, carboxyl group, carbonyl group, oxycarbonyl group, sulfide group, disulfide group, sulfonyl group, sulfinyl group, thiocarbonyl group, imino group, amino group, nitrile group, ammonium group, imido group, amido group, hydrazo group, azo group, diazo group, oxygen-containing heterocyclic group, nitrogen-containing, heterocyclic group and sulfur-containing heterocyclic group.

In another preferable embodiment of the invention, the diene polymer having a polar group in its molecule is at least one of a polybutaeine based polymer, which is obtained by polymerizing mainly butadiene, and a butadiene-aromatic vinyl compound copolymer, which is obtained by polymerizing mainly butadione and an aromatic vinyl compound.

In the other preferable embodiment of the invention, the polar group is introduced as a polar group containing monomer.

In a further preferable embodiment of the invention, the polar group-containing monomer is at least one selected from the group consisting of vinylpyridine, acrylonitrile, acrylic acid, methacrylic acid, acrylic acid ester and methacrylic acid ester In a still further preferable embodiment of the invention, the inorganic filler represented by the formula (I) is at least one selected from the group consisting of alumina ($Al_2O_3$) such as γ-alumina, α-alumina or the like; alumina monohydrate ($Al_2O_3 \cdot H_2O$) such as boehmite, diaspore or the like; alumina dihydrate ($Al_2O_3 \cdot 2H_2O$); aluminum hydroxide [$Al(OH)_3$] such as gibbsite, bayerite or the like; magnesium hydroxide [$Mg(OH)_2$], magnesium oxide (MgO), talc ($3MgO \cdot 4SiO_2 \cdot H_2O$), attapulgite ($5MgO \cdot 8SiO_2 \cdot 9H_2O$), titanium white ($TiO_2$), titanium black ($TiO_{2n-1}$), calcium oxide (CaO), calcium hydroxide [$Ca(OH)_2$], aluminum magnesium oxide ($MgO \cdot Al_2O_3$), clay ($Al_2O_3 \cdot 2SiO_2$), kaolin ($Al_2O_3 \cdot 2SiO_2 \cdot 2H_2O$), pyrophyllite ($Al_2O_3 \cdot 4SiO_2 \cdot H_2O$), bentonite ($Al_2O_3 \cdot 4SiO_2 \cdot 2H_2O$), aluminum silicate ($Al_2SiO_5, \cdot Al_4 \cdot 3SiO_4 \cdot 5H_2O$, or the like), magnesium silicate ($Mg_2SiO_4$, $MgSiO_3$, or the like), calcium silicate ($Ca_2 \cdot SiO_4$ or the like), aluminum calcium silicate ($Al_2O_3 \cdot CaO \cdot 2SiO_2$ or the like), magnesium calcium silicate ($CaMgSiO_4$), a crystalline aluminosilicate containing a hydrogen or an alkali metal or an alkaline metal for correcting an electric charge such as various zeolites; feldspan, mica, montmorillonite and the like.

In a yet further preferable embodiment of the invention, M in the formula (I) is aluminum.

DETAILED DESCRIPTION OF THE INVENTION

In the rubber composition according to the invention, a diene polymer synthesized through an emulsion polymerization and having a polar group in its molecule is used as a rubber component.

The diene polymer used in the invention must be synthesized through the emulsion polymerization because the rubber composition using the diene polymer synthesized through the emulsion polymerization are excellent in properties of a vulcanizate such as fracture properties, wear resistance and the like as compared with a rubber composition using a diene polymer obtained through a solution polymerization. Furthermore, the emulsion polymerization is good in the work-ability as compared with the solution polymerization and facilitates the introduction of the polar group to be included in the diene polymer according to the invention and is costly cheap.

As the diene polymer having a polar group, mention may be made of (1) a copolymer obtained by polymerizing a vinyl monomer having a heteroatom-containing polar group with a conjugated diene and, if necessary, an aromatic vinyl compound, and the like; (2) a diene rubber obtained by reacting a polymer of a conjugated diene or a copolymer of a conjugated diene and an aromatic vinyl compound having an active metal in its molecule with a modifier to introduce a polar group into the (co)polymer, and so on.

As the conjugated diene, mention may be made of 1,3-butadiene, isoprene, 1,3-pentadiene, 2,3-dimethylbutadiene, 2-phenyl-1,3-butadiene, 1,3-hexadiene and so on. They may be used alone or in a combination of two or more. Among them, 1,3-butadiene is particularly favorable.

As the aromatic vinyl compound used in the copolymerization with the conjugated diene, mention may be made of styrene, α-methylstyrene, 1-vinylnaphthalene, 3-vinyltoluene, ethylvinylbenzene, divinylbenzene, 4-cyclohexyl styrene, 2,4,6-trimethyl styrene and so on. They may be used alone or in a combination of two or more. Among them, styrene is particularly favorable.

When the copolymerization is carried out by using the conjugated diene and the aromatic vinyl compound as a monomer, the use of 1,3-butadiene and styrene is particularly preferable because they are excellent in the usefulness such as an easy availability of the monomer and the like.

The polar group contains a heteroatom. The suitable heteroatom is an atom belonging to Group 5B or 6B in Second Period to Fourth Period of the Periodic Table, and concretely includes a nitrogen atom, an oxygen atom, a sulfur atom, a phosphorus atom and so on. Among these atoms, nitrogen atom, oxygen atom and the like are favorable.

As the polar group containing such a heteroatom, mention may be made of a hydroxyl group, an alkoxysilyl group, an epoxy group, a carboxyl group, a carbonyl group, an oxycarbonyl group, a sulfide group, a disulfide group, a sulfonyl group, a sulfinyl group, a thiocarbonyl group, an imino group, an amino group, a nitrile group, an ammonium group, an imido group, an amido group, a hydrazo group, an azo group, a diazo group, an oxygen-containing heterocyclic group, a nitrogen-containing heterocyclic group, a sulfur-containing heterocyclic group and so on. Among them, hydroxyl group, carboxyl group, epoxy group, sulfide group, sulfonyl group, amino group, nitrogen-containing heterocyclic group, alkoxysilyl group and so on are favorable, and particularly hydroxyl group, amino group, carboxyl group, nitrogen-containing heterocyclic group and alkoxysilyl group are most preferable.

In the copolymerization of the above item (1), a content of each monomer in the polar group-containing diene rubber may properly be selected in accordance with use purposes. In case of a polymer rubber comprised of a vinyl monomer having a heteroatom containing polar group, a conjugated diene and an aromatic vinyl compound, a content of a bond unit of the polar group-containing vinyl monomer is preferably 0.01–20% by weight, more preferably 0.05–15% by weight, particularly 0.1–10% by weight, and a content of a bond unit of the conjugated diene is preferably 40–94.99% by weight, more preferably 50–85% by weight, particularly 55–80% by weight, and a content of a bond unit of the aromatic vinyl compound is preferably 5–55% by weight, more preferably 10–45% by weight, particularly 15–40% by weight. By using a copolymer rubber latex having the above content of each of the monomer bond units is obtained a rubber composition having highly balanced hysteresis property and wet skid resistance.

In the polar-group containing diene rubber obtained by introducing a heteroatom-containing polar group through the reaction of the above item (2), a content of each monomer is properly selected in accordance with required properties. That is, a content of a bond unit of the conjugated diene is preferably 40–100% by weight, more preferably 50–90% by weight particularly 60–85% by weight, and a content of a bond unit of the aromatic vinyl compound is preferably 0–60% by weight, more preferably 10–50% by weight, particularly 15–40% by weight.

The polar-group-containing vinyl monomer is not particularly limited as long as it is a polymerizable monomer containing at least one polar group in its molecule, and concretely includes an amino group containing vinyl monomer, a pyridyl group-containing vinyl monomer, a hydroxyl group-containing vinyl monomer, a carboxyl group-containing vinyl monomer, an alkoxysilyl group-containing vinyl monomer and so on. These polar-group-containing vinyl monomers may be used alone or in a combination of two or more.

As the amino group-containing vinyl monomer, mention may be made of polymerizable vinyl monomers having, in their molecules, at least one amino group selected from a primary, secondary and tertiary amino groups. Among them, a tertiary amino group-containing vinyl monomer is particularly favorable. These amino group-containing vinyl monomers may be used alone or in a combination of two or more.

As the primary amino group-containing vinyl monomer, mention may be made of acrylamide, methacrylamide, p-aminostyrene, aminomethyl (meth)acrylate, aminoethyl (meth)acrylate, aminopropyl (meth)acrylate, aminobutyl (meth)acrylate and so on. Throughout the specification, (meth)acryl means either acryl or methacryl.

As the secondary amino group-containing vinyl monomer, mention may be made of N-monosubstituted (meth)acrylamides such as anilinostyrenes disclosed in JP-A-61-130355; aminophenyl butadienes disclosed in JP-A-61-130356; N-methyl(meth)acrylamide, N-ethyl (meth)acrylamide, N-methylol acrylamide, N-(4-aminophenyl)methacrylamide and so on.

As the tertiary amino group-containing vinyl monomer, mention may be made of N,N-disubstituted aminoalkylacrylates, N,N-disubstituted aminoalkylacrylamides, N,N-disubstituted amino aromatic vinyl compounds, vinyl compounds having a pyridine group and so on.

As the N,N-disubstituted aminoacrylate, mention may be made of esters of acrylic acid or methacrylic acid such as N,N-dimethylaminomethyl (meth)acrylate, N,N-dimethylaminoethyl(meth)acrylate, N,N-diethylaminopropyl (meth)acrylate, N,N-dimethylaminobutyl(meth)acrylate, N,N-diethylaminoethyl (meth)acrylate, N,N-diethylamninopropyl(meth)acrylate, N,N-diethylaminobutyl (meth)acrylate, N-methyl-N-ethylaminoethyl(meth)acrylate, N,N-dipropylaminoethyl (meth)acrylate, N,N-dibutylaminoethyl(meth)acrylate, N,N-dibutylaminopropyl (meth)acrylate, N,N-dibutylaminobutyl (meth)acrylate, N,N-dihexylminoethyl (meth)acrylate, N,N-dioctylaminoethyl(meth)acrylate, acryloyl morpholine and so on. Among them, N,N-dimethylaminoethyl(meth) acrylate, N,N-diethylaminoethyl (meth)acrylate, N,N-dipropylaminoethyl (meth)acrylate, N,N-dioctylaminoethyl (meth)acrylate, N-methyl-N-ethylaminoethyl(meth)acrylate and the like are preferable.

As the N,N-disubstituted aminoalkyl acrylamide, mention may be made of acrylamide compounds and methacrylamide compounds such as N,N-dimethylaminomethyl (meth) acrylamide, N,N-dimethylaminoethyl (meth)acrylamide, N,N-dimethylaminopropyl (meth)acrylamide, N,N-dimethylaminobutyl (meth)acrylamide, N,N-diethylaminoethyl (meth)acrylamide, N,N-diethylaminopropyl(meth)acrylamide, N,N-diethylaminobutyl (meth)acrylamide, N-methyl-N-ethylaminoethyl (meth)acrylamide, N,N-dipropylaminoethyl (meth)acrylamide, N,N-dibutylaminoethyl (meth)acrylamide, N,N-dibutylaminopropyl (meth)acrylamide, N,N-dibutylaminobutyl (meth)acrylamide, N,N-dihexylaminoethyl (meth)acrylamide, N,N-dihexylaminopropyl (meth)acrylamide, N,N-diocylaminopropyl (meth)acrylamide, and so on. Among them, N,N-dimethylaminopropyl (meth)acrylamide, N,N-diethylaminopropyl (meth)acrylamide, N,N-dioctylaminopropyl (meth)acrylamide and the like are preferable.

As the N,N-disubstituted amino aromatic vinyl compound, mention may be made of styrene derivatives such as N,N-dimethylaminoethyl styrene, N,N-diethylaminoethyl styrene, N,N-dipropylaminoethyl styrene, N,N-dioctylaminoethyl styrene and so on.

And also, a nitrogen-containing heterocyclic group may be used instead of the amino group. As a nitrogen-containing heterocyclic compound, mention may be made of pyrrole, histidine, imidazole, triazolidine, triazole, triazine, pyridine, pyrimidine, pyrazine, indole, quinoline, purine, phenazine, pteridine, melamine and so on. The nitrogen-containing heterocyclic compound may contain other heteroatom in its ring.

Further, the pyridyl group-containing vinyl compound includes, for example, 2-vinyl pyridine, 3-vinyl pyridine, 4-vinyl pyridine, 5-methyl-2-vinyl pyridine, 5-ethyl-2-vinyl pyridine and so on. Among them, 2-vinyl pyridine and 4vinyl pyridine are favorable.

As the hydroxyl group-containing vinyl monomer, mention may be made of polymerizable monomers having, at least one of primary, secondary and tertiary hydroxyl groups in their molecules. Such a hydroxyl group-containing vinyl monomer includes, for example, unsaturated carboxylic acid monomers, vinyl ether monomers, vinyl ketone monomers and so on, each of which has a hydroxyl group. Among them, a hydroxyl group-containing unsaturated carboxylic acid monomer is favorable. As the hydroxyl group-containing unsaturated carboxylic acid monomer, mention may be made of esters, amides, anhydrides and so on of acrylic acid, methacrylic acid, itaconic acid, fumaric acid, maleic acid and the like. Among them, ester compounds of acrylic acid and methacrylic acid are preferable.

As the hydroxyl group-containing vinyl monomer, mention may be made of hydroxymethyl (meth)acrylate, 2-hydroxyethyl (meth)acrylate, 2-hydroxypropyl (meth) acrylate, 3-hydroxypropyl (meth)acrylate, 3-chloro-2-hydroxypropyl (meth)acrylate, 3-phenoxy-2-hydroxypropyl (meth)acrylate, glycerolmono (meth)acrylate, hydroxybutyl (meth)acrylate, 2-chloro-3-hydroxypropyl (meth)acrylate, hydroxyhexyl (meth)acrylate, hydroxyoctyl (meth)acrylate, hydroxymethyl (meth)acrylamide, 2-hydroxypropyl (meth) acrylamide, 3-hydroxypropyl (meth)acrylamide, di-(ethyleneglycol)itaconate, di-(propyleneglycol) itaconate, bis(2-hydroxypropyl)itaconate, bis(2-hydroxyethyl) itaconate, bis(2-hydroxyethyl)fumarate, bis(2-hydroxyethyl)maleate, 2-hydroxyethyl vinyl ether, hydroxymethyl vinyl ketone, allyl alcohol and so on. Among them, hydroxymethyl (meth)acrylate, 2-hydroxyethyl (meth)acrylate, 2-hydroxypropyl (meth)acrylate, 3-hydroxypropyl(meth)acrylate, 3-phenoxy-2-hydroxypropyl (meth)acrylate, glycerolmono(meth)acrylate, hydroxybutyl (meth)acrylate, hydroxyhexyl(meth)acrylate, hydroxyoctyl (meth)acrylate, hydroxymethyl (meth)acrylamide, 2-hydroxypropyl (meth)acrylamide, 3-hydroxypropyl (meth)acrylamide and the like are favorable As the alkoxysilyl group-containing vinyl monomer, mention may be made of trimethoxyvinyl silane disclosed in JP-A-7-188356, triethoxyvinyl silane, 6-trimethoxysilyl-1,2-hexene, p-trimethoxysilyl styrene, 3-trimethoxysilylpropyl methacrylate, 3-triethoxysilylpropyl acrylate and so on.

As the carboxyl group-containing vinyl monomer, mention maybe made of acrylic acid, methacrylic acid, itaconic acid, fumaric acid, maleic acid and so on.

The emulsion polymerization used in the invention can be carried out under conditions according to the well-known method. For instance, when a total amount of monomers used is 100 parts by weight, the emulsion polymerization can be conducted at a polymerization temperature of 0–100° C., preferably 0–80° C. by using 100–500 parts by weight of water. As a system of the emulsion polymerization, there can be adopted a batch system, a system of dividedly or continuously feeding the monomers, a system of dividedly or continuously adding a pre-emulsion of a monomer, a system of stepwise combining the above systems and the like. Alternatively, the emulsion polymerization may be conducted by the batch system, the system of dividedly or continuously adding the pre-emulsion or the like after the monomers, water and an emulsifier are forcedly emulsified by using a high-pressure homogenizer, an ultrasonic dispersing machine or the like to previously prepare a pre-emulsion. Moreover, a conversion of the monomers in the above emulsion polymerization is preferably not more than 80% by weight) more preferably not more than 70% by weight.

A polymerization initiator used in the above emulsion polymerization is not particularly limited, so that initiators used in the usual emulsion polymerization can be properly used. As the initiator, mention may be made of an inorganic persulfate, an organic peroxide, an azo compound, a redox initiator system combining a peroxide and a reducing agent, and so on. Concretely, the persulfate includes potassium persufate, ammonium persulfate and the like; the organic peroxide includes benzoyl peroxide, lauroyl peroxide, tert-butylperoxy-2-ethyl hexanoate, tertbutylhydroperoxide, cumene hydroperoxide, p-menthane hydroperoxide and the like; the azo compound includes azobisisobutyronitrile, dimethyl-2,2'-azobisisobutyrate, 2-carbamoylazaisobutyronitrile and the like; the redox initiator includes a combination of a radical initiator and a reducing agent such as sodium hydrogen sulfite, ferrous sulfate or the like. If it is intended to conduct polymerization at a lower temperature or to increase a polymerization rate, a redox system containing a radical initiator compound with a peroxide group may be used.

In the emulsion polymerization according to the invention, one or more of a molecular weight modifier, a chelating agent an inorganic electrolyte and the like may be used, if necessary. As the molecular weight modifier, mention may be made of halogenated hydrocarbons such as chloroform, carbon tetrachloride and the like; mercaptanes such as n hexyl mercaptane, n-octyl mercaptane, n-dodecyl mercaptane, t-dodecyl mercaptane and the like; xanthogens such as dimethylxanthogen disulfide, di-i-propylxanthogen disulfide and the like; α-methylstyrene dimer, 1,1-diphenylethylene and so on.

As an emulsifier used in the emulsion polymerization, mention may be made of an anionic surfactant, a nonionic surfactant, a cationic surfactant, an amphoteric surfactant and so on. And also, a fluorine-based surfactant may be used. These emulsifiers may be used alone or in a combination of two or more. In general, the anionic surfactant is in heavy usage. As the anionic surfactant are used, for example, a long-chain aliphatic acid salt having a carbon number of not less than 10, a rosin acid salt and so on. Among them, there may be mentioned potassium salts and sodium salts of capric acid, lauric acid, myristic acid, palmitic acid, oleic acid and stearic acid.

The amount of the emulsifier used in the emulsion polymerization (converted as nonvolatile matter) is favorable to be within a range of 0.01–20 parts by weight, preferably 0.5–10 parts by weight based on 100 parts by weight of a radical polymerizable monomer fed for the polymerization. When the amount of the emulsifier is outside the above range, the conversion tends to lower or the effect by using the emulsifier is not sufficiently obtained.

The diene polymer having the polar group in its molecule according to the invention can be obtained, for example, by emulsion-polymerizing at least one of monomer having the aforementioned polar groups with a diene compound. Moreover, the polar group-containing diene polymers may be used alone or in a combination of two or more.

In the diene polymer having the polar group in its molecule according to the invention, a glass transition temperature (Tg) as measured by a differential scanning calorimetry (DSC) is favorable to be −90° C. to −30° C. And also, such a diene polymer preferably has a Mooney viscosity (ML$_{1+4}$/100° C.) of 10–150, more preferably 15–70. When the Mooney viscosity is less than 10, properties of a vulcanizate such as wear resistance and the like may not be sufficiently obtained, while when it exceeds 150, the processability tends to lower and it may be difficult to mill the diene polymer with other compounding ingredients.

In the rubber composition according to the invention, a preferable amount of the diene polymer having a polar group in its molecule in the rubber component is dependent upon an amount and a strength of the polar group contained, but the diene polymer is favorable to contain at least 0.01% by weight of the polar group to be bonded. When the amount of the polar group is not less than 0.01% by weight, a rubber composition having desired properties can be obtained. The preferable amount of the diene polymer having the polar group in its molecule in the rubber component is not less than 0.01% by weight, particularly 0.01–20% by weight. The amount of the polar group-containing diene polymer in the rubber component is not less than 0.01% by weight, preferably 0.01–20% by weight.

As a rubber component used together with such a diene polymer, mention may be made of natural rubber and synthetic diene rubbers. The synthetic diene rubber includes, for example, styrene-butadiene copolymer (SBR), polybutadiene (BR), polyisoprene (IR), butyl rubber (IIR), ethylene-propylene-diene terpolymer and a blend thereof. Further, a part of the synthetic diene rubber may have a branched structure obtained by using a polyfunctional modifier such as tin tetrachloride or the like.

The inorganic filler used in the invention is represented by the formula (I):

$$mM \cdot xSiO_y \cdot zH_2O \quad (1)$$

wherein M is a metal selected from the group consisting of aluminum, magnesium, titanium and calcium, an oxide or a hydroxide of such a metal or an hydrate thereof, m is an integer of 1 to 5, x is an integer of 0 to 10, y is an integer of 2 to 5 and z is an integer of 0 to 10. Further formula (I) may contain a metal such as potassium, sodium, iron, magnesium or the like, an element such as fluorine or the like, and a group such as $NH_4$— or the like.

Concretely, the inorganic filler includes alumina ($Al_2O_3$) such as γ-alumina, α-alumina or the like; alumina monohydrate ($Al_2O_3 \cdot H_2O$); such as boehmite, diaspore or the like; alumina dihydrate ($Al_2O_3 \cdot 2H_2O$); aluminum hydroxide [Al(OH)$_3$] such as gibbsite, bayerite or the like; magnesium hydroxide [(Mg(OH)$_2$], magnesium oxide (MgO), talc ($3MgO \cdot 4SiO_2 \cdot H_2O$), attapulgite ($5MgO \cdot 8SiO_2 \cdot 9H_2O$), titanium white ($TiO_2$), titanium black ($TiO_{2n-1}$), calcium oxide (CaO), calcium hydroxide [Ca(OH)$_2$], aluminum magnesium oxide ($MgO \cdot Al_2O_3$), clay ($Al_2O_3 \cdot 2SiO_2$), kaolin ($Al_2O_3 \cdot 2SiO_2 \cdot 2H_2O$), pyrophyllite ($Al_2O_3 \cdot 4SiO_2 \cdot H_2O$), bentonite ($Al_2O_3 \cdot 4SiO_2 \cdot 2H_2O$), aluminum silicate ($Al_2SiO_5$, $Al_4 \cdot 3SiO_4 5H_2O$, or the like), magnesium silicate ($Mg_2SiO_4$, $MgSiO_3$, or the like), calcium silicate ($Ca_2 \cdot SiO_4$ or the like), aluminum calcium silicate ($Al_2O_3 \cdot CaO \cdot 2SiO_2$ or the like), magnesium calcium silicate ($CaMgSiO_4$), a crystalline aluminosilicate containing a hydrogen or an alkali metal or an alkaline metal for correcting an electric charge such as various zeolites; feldspan, mica, montmorillonite and the like. It is preferable that M in the formula (I) is aluminum.

Among the above inorganic fillers, alumina represented by a formula of $Al_2O_3 \cdot nH_2O$ (wherein n is 0 to 3) and clays are preferable. The clays include clay, kaolin, pyrophylite, bentonite, montmorillonite and the like.

The inorganic filler is favorable to have a particle size of not more than 10 μm, preferably not more than 3 μm. When the particle size of the inorganic filler is rendered into not more than 10 μm, the fracture properties and wear resistance of a vulcanized rubber composition can be well maintained.

In the invention, the inorganic fillers may be used alone or in a combination of two or more. And also, a content of the inorganic filler is favorable to be within a range of 5 to 80 parts by weight based on 100 parts by weight of the rubber component. By rendering the content into not less than 5 parts by weight is obtained a sufficient gripping property on a wet road surface, while the wear resistance and other properties required for the rubber composition can be well maintained by rendering the content of the inorganic filler into not more than 80 parts by weight. Considering the wear resistance, wet performances and low fuel consumption property, the more preferable content of the inorganic filler is within a range of 5 to 60 parts by weight.

In the rubber composition according to the invention, a reinforcing filler usually used such as carbon black, silica or the like may be compounded, if necessary. As the carbon black, use may be made of any blacks such as channel black, furnace black, acetylene black, thermal black and so on. And also, the carbon black is favorable to have a nitrogen adsorption specific surface area (BET) of not less than 70 m$^2$/g and a dibutyl phthalate absorption (DBP) of not less than 90 ml/100 g. When BET value is less than 70 m$^2$/g, it is difficult to obtain a sufficient wear resistance, while as it becomes larger, the low fuel consumption property tends to be degraded. Considering the wear resistance and low fuel consumption property, a preferable BET value is within a range of 90–180 m$^2$/g. Moreover, the BET value is measured according to ASTM D3037-88. On the other hand, when DBP value is less than 90 ml/100 g, it is difficult to obtain a sufficient wear resistance, while as it becomes larger, the elongation at break of the rubber composition tends to be degraded. Considering the wear resistance and elongation at break, a more preferable DBP value is within a range of 100–1580 ml/100 g. Moreover, the DB value is measured according to JIS K6221-1982 (method A).

On the other hand, the silica is not particularly limited, and may be properly selected from any silica usually used for reinforcing rubber such as dry-type silica, wet-type silica and so on. Among them, the wet type silica is favorable. Considering the wear resistance and low fuel consumption, the silica is favorable to have a nitrogen adsorption specific surface area (BET) of 100 to 300 m$^2$/g. Moreover, this BET is a value measured according to ASTM D4820-93 after being dried at 300° C. for 1 hour.

In the invention, either carbon black or silica or both may be used as a third component, if necessary. In this case, an amount of the third component compounded is favorable to be within a range of 5–85 parts by weight based on 100 parts by weight of the rubber component from a viewpoint of a balance among the wear resistance, wet performances and low fuel consumption and the like.

In order to further improve the effect in the rubber composition according to the invention, a coupling agent may be compounded, if desired. The coupling agent is not particularly limited and can be properly selected from the conventionally known various coupling agents. Among them, a silane coupling agent is particularly preferable.

As the silane coupling agent, mention may be made of compounds represented by a general formula of $(RO)_3Si$—$S_m$—$Si(OR)_3$ or $XSi(OR)_3$ (wherein R is a group capable of conducting hydrolysis of OR such as methyl group, ethyl group or the like, and X is a functional group reacting with an organic substance such as a mercaptoalkyl group, an aminoalkyl group, vinyl group, epoxy group, a glycidoxyalkyl group, benzothiazolyl group, N,N-dimethylcarbamoyl group or the like, and m is a number satisfying $0<m\leq9$). There are concretely mentioned bis(3-triethoxysilylpropyl) tetrasulfide, bis(3-trimethoxysylylpropyl) tetrasulfide, bis(3-methyldimethoxysilylpropyl) tetrasulfide, bis(3-triethoxysilylethyl)tetrasulfide, bis(3-triethoxysilylpropyl) disulfide, bis(3-trimethoxysilylpropyl) disulfide, bis(3-triethoxysilylpropyl) trisulfide, 3-mercaptopropyl trimethoxysilane, 3-mercaptopropyl triethoxysilane, vinyl triethoxysilane, vinyl trimethoxysilane, 3-aminopropyl triethoxysilane, 3-aminopropyl trimethoxysilane, 3-mercaptopropylmethyl dimethoxysilane, γ-glycidoxypropyltrimethoxysilane, γ-glycidoxypropylmethyl diethoxysilane, 3-trimethoxysilylpropyl-N,N-dimethylcarbamoyl tetrasulfide, 3-trimethoxysilylpropyl benzothiazolyl tetrasulfide, 3-trimethoxysilylpropyl methacryloyl monosulfide and so on. In the invention, the above coupling agents may be used alone or in a combination of two or more.

And also, a content of the coupling agent is preferably not more than 15% by weight of the amount of the inorganic filler. When the content exceeds 15% by weight, a sufficient improvement of the effect by the addition of the coupling agent may not be recognized and such an addition become rather disadvantageous from economic reasons. Considering the compounding effect and economical reason, a more preferable content of the coupling agent is not more than 10% by weight. As an example of enhancing the effect by compounding the coupling agent, there can be mentioned, for example, a rubber composition containing silica as a reinforcing filler. In this case, the content of the coupling agent is favorable to be selected within a range of 1–20% by weight per silica. When the content is less than 1% by weight, the effect by the addition of the coupling agent is not sufficiently developed, while when it exceeds 20% by weight, the improvement of the effect is not recognized and the addition is rather disadvantageous in economical reasons. Considering the compounding effect and economical reason, therefore, a preferable content of the coupling agent is within a range of 2–15% by weight.

The rubber composition according to the invention may be compounded with various chemicals usually used in a rubber industry such as a vulcanizing agent, a vulcanization accelerator, an antioxidant, a scorch retarder, a softening agent, other fillers, zinc white, stearic acid, other coupling agent and so on within a scope of the invention, if desired.

The rubber composition according to the invention is obtained by milling in a milling machine such as rolls, an internal mixer or the like, and then shaped and vulcanized, which can be used to not only an application for tires such as a tire tread, an undertread, a carcass, a sidewall, a bead portion or the like but also other industrial goods such as a rubber insulator, a belt, a hose and the like. Particularly, the rubber composition according to the invention is preferably used as a rubber composition for a tire tread.

The following examples are given in illustration of the invention and are not intended as limitations thereof. Moreover, properties of polymers and properties of rubber compositions are measured according to the following methods.

Mooney Viscosity of Polymer

The Mooney viscosity ($ML_{1+4}$) of the polymer is measured at a measuring temperature of 100° C. by using a tester of RLM-01 model made by Toyo Seiki Co., Ltd. according to JIS K6300-1994.

Fracture Properties of Rubber Composition

A tensile strength (Tb) is measured according to JIS K6251-1993.

Wear Resistance of Rubber Composition

A wearing test is conducted at 25° C. under a slipping ratio of 25% by a Lambourn abrasion tester to measure a worn amount, and the wear resistance is represented by an index on the basis that a reciprocal of the worn amount in Comparative Example 1 is 100, in which the larger the index value, the better the wear resistance.

Various Diene Polymers are Synthesized by the Following Methods (1) Oil-extended Styrene-butadiene Copolymer (A)

Into a polymerization vessel purged with nitrogen are charged 200 parts by weight of water, 4.5 parts by weight of rosin soap, 58 parts by weight of butadiene, 42 parts by weight of styrene and 0.3 pan by weight of t-dodecylmercaptan. After a temperature of the polymerization vessel is set to 5° C., polymerization is started by adding 0.1 part by weight of p-methane hydroperoxide, 0.07 part by weight of sodium ethylenediamine tetraacetate, 0.05 part by weight of ferrous sulfate heptahydrate and 0.15 part by weight of sodium formaldehyde sulfoxylate as a polymerization initiator, and diethylhydroxyamine is added at a time that a conversion reaches 60% to stop the polymerization. Then, unreacted monomers are recovered by steam shipping to obtain an aqueous dispersion (a) of styrene-butadiene copolymer having a solid concentration of 21%. Thereafter, the aqueous dispersion (a) of styrene-butadiene copolymer is mixed with 37.5 parts by weight of an aromatic oil (Fukkol Aromax #3, trade mark, made by Fuji Kosan Co., Ltd.) based on 100 parts by weight of the solid content in the copolymer to form an emulsion, which is coagulated with sulfuric acid and sodium chloride to form a crumb and washed with water and dried by a hot drier to obtain an oil-extended styrene-butadiene copolymer (A). The oil-extended styrene-butadiene copolymer (A) has a bound styrene content of 35% by weight and a Mooney viscosity of 50.

(2) Oil-extended Polar Group-containing Styrene-butadiene Copolymer (B)

Into a polymerization vessel purged with nitrogen are charged 200 parts by weight of water, 4.5 parts by weight of rosin soap, 57.5 parts by weight of butadiene, 42 parts by weight of styrene, 0.5 part by weight of hydroxyethyl methactylate and 0.3 part by weight of t-dodecylmercaptan. After a temperature of the polymerization vessel is set to 5° C., polymerization is started by adding 0.1 part by weight of p-menthane hydroperoxide, 0.07 part by weight of sodium ethylenediamine tetraacetate, 0.05 part by weight of ferrous sulfate heptahydrate and 0.15 part by weight of sodium formaldehyde sulfoxylate as a polymerization initiator, and diethylhydroxyamine is added at a time that a conversion reaches 60% to stop the polymerization. Then, unreacted monomers are recovered by steam stripping to obtain an aqueous dispersion (b) of a polar group-containing styrene-butadiene copolymer having a solid concentration of 21%.

Thereafter, the aqueous dispersion (b) of tic polar group-containing styrene-butadiene copolymer is mixed with 37.5 parts by weight of an aromatic oil (Fukkol, Aromax #3, trade mark, made by Fuji Kosan Co., Ltd.) based on 100 parts by weight of the solid content in the copolymer to form an emulsion, which is coagulated with sulfuric acid and sodium chloride to form a crumb and washed with water and dried by a hot drier to obtain an oil-extended polar group-containing styrene-butadiene copolymer (B). The oil-extended polar group-containing styrene-butadiene copolymer (B) has a bound styrene content of 35% by weight and a Mooney viscosity of 48.

(3) Oil-extended Polar Group-containing, Styrene-butadiene Copolymers (C–J)

The same polymerization as in the above item (2) is conducted except that an amount of butadiene charged, an amount of styrene charged and an amount and kind of a third component instead of hydroxyethyl methacrylate are changed in Table 1 to obtain one of aqueous dispersions (c) to 0) of polar group-containing styrene-butadiene copolymers.

Thereafter, each of these aqueous dispersions (e) to A) of polar group-containing styrene-butadiene copolymers is mixed with 37.5 parts by weight of an aromatic oil (Fukkol—Aromax #3, trade mark, made by Fuji Kosan Co., Ltd.) based on 100 parts by weight of the solid content in the copolymer to form an emulsion, which is coagulated with sulfuric acid and sodium chloride to form a crumb and washed with water and dried by a hot drier to obtain oil-extended polar group-containing styrene-butadiene copolymers (C) to (J), respectively. The oil-extended polar group-containing styrene-butadiene copolymers (C) to (J) have a bound styrene content of 35% by weight (provided that the copolymer (E) has a bound styrene content of 20% by weight) and a Mooney viscosity shown in Table 1.

TABLE 1

| Oil-extended diene rubber | | A | B | C | D | E | F | G | H | I | J |
|---|---|---|---|---|---|---|---|---|---|---|---|
| Feed amount (part by weight) | butadiene | 58 | 57.5 | 57 | 57 | 66 | 57 | 57 | 51 | 56 | 57.5 |
| | styrene | 42 | 42 | 42 | 42 | 26 | 42 | 42 | 42 | 42 | 42 |
| | acrylonitrile | | | | | 8 | | | | | |
| | 2-hydroxyethyl methacrylate | | 0.5 | | | | | | | | |
| | diethylaminoethyl methacrylate | | | 1 | | | | | | | |
| | 4-vinylpyridine | | | | 1 | | | | | | |
| | methacrylic acid | | | | | | 1 | | | | |
| | itaconic acid | | | | | | | 1 | | | |
| | butyl acrylate | | | | | | | | 7 | | |
| | methacrylamide | | | | | | | | | 2 | |
| | γ-methacryloxypropyl methacrylate | | | | | | | | | | 0.5 |
| Bonding content (% by weight) | styrene | 35 | 35 | 35 | 35 | 20 | 35 | 35 | 35 | 35 | 35 |
| | acrylonitrile | | | | | 10 | | | | | |
| | 2-hydroxyethyl methacrylate | | 0.3 | | | | | | | | |
| | diethylaminoethyl methacrylate | | | 0.7 | | | | | | | |
| | 4-vinylpyridine | | | | 0.6 | | | | | | |
| | methacrylic acid | | | | | | 0.8 | | | | |
| | itaconic acid | | | | | | | 0.6 | | | |
| | butyl acrylate | | | | | | | | 4 | | |
| | methacrylamide | | | | | | | | | 0.9 | |
| | γ-methacryloxypropyl methacrylate | | | | | | | | | | 0.4 |
| Extending oil (part by weight) | | 37.5 | 37.5 | 37.5 | 37.5 | 37.5 | 37.5 | 37.5 | 37.5 | 37.5 | 37.5 |
| Mooney viscosity after oil extension | | 50 | 48 | 51 | 52 | 52 | 49 | 48 | 53 | 51 | 52 |

(4) Styrene-butadiene Copolymer (K)

Into a polymerization vessel purged with nitrogen are charged 200 parts by weight of water, 4.5 parts by weight of rosin soap, 72 parts by weight of butadiene, 28 parts by weight of styrene and 0.3 part by weight of t-dodecylmercaptan. After a temperature of the polymerization vessel is set to 5° C., polymerization is started by adding 0.1 part by weight of p-menthane hydroperoxide, 0.07 part by weight of sodium ethylenediamine tetraacetate, 0.05 part by weight of ferrous sulfate heptahydrate and 0.15 part by weight of sodium formaldehyde sulfoxylate as a polymerization initiator, and diethylhydroxyamine is added at a time that a conversion reaches 60% to stop the polymerization. Then, unreacted monomers are recovered by steam stripping to obtain an aqueous dispersion (k) of styrene-butadiene copolymer having a solid concentration of 21%.

Thereafter, the aqueous dispersion (k) of styrene-butadiene copolymer is coagulated with sulfuric acid and sodium chloride to form a crumb and washed with water and dried by a hot drier to obtain a styrene-butadiene copolymer (K). The styrene-butadiene copolymer (K) has a bound styrene content of 23.5% by weight and a Mooney viscosity of 50.

(5) Polar Group-containing Styrene-butadiene Copolymer (L)

Into a polymerization vessel purged with nitrogen are charged 200 parts by weight of water, 4.5 parts by weight of rosin soap, 71.5 parts by weight of butadiene, 28 parts by weight of styrene, 0.5 part by weight of hydroxyethyl methacrylate and 0.3 part by weight of t-dodecylmercaptan. After a temperature of the polymerization vessel is set to 5° C., polymerization is started by adding 0.1 part by weight of p-menthane hydroperoxide, 0.07 part by weight of sodium ethylenediamine tetraacetate, 0.05 part by weight of ferrous sulfate heptahydrate and 0.15 part by weight of sodium formaldehyde sulfoxylate as a polymerization initiator, and diethylhydroxyamine is added at a time that a conversion reaches 60% to stop the polymerization. Then, unreacted monomers are recovered by steam stripping to obtain an aqueous dispersion (1) of a polar group-containing styrene-butadiene copolymer having a solid concentration of 21%.

Thereafter, the aqueous dispersion (1) of the polar group-containing styrene-butadiene copolymer is coagulated with sulfuric acid and sodium chloride to form a crumb and washed with water and dried by a hot drier to obtain a polar group-containing styrene-butadiene copolymer (L). The styrene-butadiene copolymer (L) has a bound styrene content of 23.5% by weight and a Mooney viscosity of 47.

(6) Polar Group-containing Styrene-butadiene Copolymers (M–O)

The same polymerization as in the above item (5) is conducted except that an amount of butadiene charged, an amount of styrene charged and an amount and kind of a third component instead of hydroxyethyl methacrylate are chanced in Table 2 to obtain aqueous dispersions (m) to (o) of polar group-containing styrene-butadiene copolymers.

Thereafter, each of these aqueous dispersions (m) to (o) of the polar group-containing styrene-butadiene copolymers is coagulated with sulfuric acid and sodium chloride to form a crumb and washed with water and dried by a hot drier to obtain polar group-containing styrene-butadiene copolymers (M) to (O), respectively. The styrene-butadiene copolymers (M) to (O) have a bound styrene content of 23.5% by weight (provided that the copolymer (N) has a bound styrene content of 13% by weight) and a Mooney viscosity shown in Table 2.

(7) Butadiene Homopolymer (P)

Into a polymerization vessel purged with nitrogen are charged 200 parts by weight of water, 4.5 parts by weight of rosin soap, 100 part by weight of butadiene and 0.7 part by weight of t-dodecylmercaptan. After a temperature of the polymerization vessel is set to 5° C., polymerization is started by adding 0.1 part by weight of p-menthane hydroperoxide, 0.07 part by weight of sodium ethylenediamine tetraacetate, 0.05 part by weight of ferrous sulfate heptahydrate and 0.15 part by weight of sodium formaldehyde sulfoxylate as a polymerization initiator, and diethylhydroxyamine is added at a time that a conversion reaches 60% to stop the polymerization. Then, unreacted monomers are recovered by steam stripping to obtain an aqueous dispersion (p) of butadiene homopolymer having a solid concentration of 21%.

Thereafter, the aqueous dispersion (p) of butadiene homopolymer is coagulated with sulfuric acid and sodium chloride to form a crumb and washed with water and dried by a hot drier to obtain a butadiene homopolymer (P). The butadiene homopolymer (P) has a Mooney viscosity of 48.

(8) Polar Group-containing Butadiene Homopolymer (Q)

Into a polymerization vessel purged with nitrogen are charged 200 parts by weight of water, 4.5 parts by weight of rosin soap, 100 parts by weight of butadiene, 8 parts by weight of acrylonitrile and 0.7 part by weight of t-dodecylmercaptan. After a temperature of the polymerization vessel is set to 5° C., polymerization is started by adding 0.1 part by weight of p-methane hydroperoxide, 0.07 part by weight of sodium ethylenediamine tetraacetate, 0.05 part by weight of ferrous sulfate heptahydrate and 0.15 part by weight of sodium formaldehyde sulfoxylate as a polymerization initiator, and diethylhydroxyamine is added at a time that a conversion reaches 60% to stop the polymerization. Then, unreacted monomers are recovered by steam stripping to obtain an aqueous dispersion (q) of a polar group-containing butadiene homopolymer having a solid concentration of 21%.

Thereafter, the aqueous dispersion (q) of the polar group-containing butadiene homopolymer is coagulated with sulfuric acid and sodium chloride to form a crumb and washed with water and dried by a hot drier to obtain a polar group-containing butadiene homopolymer (Q). The polar group-containing butadiene homopolymer (Q) has a Mooney viscosity of 50.

(9) Polar Group-containing Butadiene Homopolymers (R–T)

The same polymerization as in the above item (8) is conducted except that an amount of butadiene charged and an amount and kind of a third component are changed in Table 2 to obtain aqueous dispersions (r) to (t) of polar group-containing butadiene homopolymers.

Thereafter, each of these aqueous dispersions (r) to (t) of the polar group-containing butadiene homopolymers is coagulated with sulfuric acid and sodium chloride to form a crumb and washed with water and dried by a hot drier to obtain polar group-containing butadiene homopolymers (R) to (T), respectively. The polar group-containing butadiene homopolymers (R) to (T) have a Mooney viscosity shown in Table 2.

TABLE 2

| Diene rubber | | K | L | M | N | O | P | Q | R | S | T |
|---|---|---|---|---|---|---|---|---|---|---|---|
| Feed amount (part by weight) | butadiene | 72 | 71.5 | 71 | 76 | 71 | 100 | 92 | 99.5 | 99 | 99 |
| | styrene | 28 | 28 | 28 | 16 | 28 | | | | | |
| | acrylonitrile | | | | 8 | | | 8 | | | |
| | 2-hydroxyethyl methacrylate | | 0.5 | | | | | | 0.5 | | |
| | diethylaminoethyl methacrylate | | | 1 | | | | | | 1 | |
| | itaconic acid | | | | | 1 | | | | | 1 |
| Bonding content (% by weight) | styrene | 23.5 | 23.5 | 23.5 | 13 | 23.5 | 0 | 0 | 0 | 0 | 0 |
| | acrylonitrile | | | | 10 | | | 10 | | | |
| | 2-hydroxyethyl methacrylate | | 0.3 | | | | | | 0.3 | | |
| | diethylaminoethyl methacrylate | | | 0.7 | | | | | | 0.7 | |
| | itaconic acid | | | | | 0.6 | | | | | 0.6 |
| Mooney viscosity | | 50 | 47 | 51 | 48 | 48 | 48 | 50 | 50 | 52 | 49 |

EXAMPLES 1–93, COMPARATIVE EXAMPLES 1–22

Various rubber compositions are prepared by using the thus obtained diene polymers A to T according to one of compounding recipes shown in Table 3 together with an inorganic filler shown in Table 4 and then vulcanized at 160° C. for 15 minutes, respectively, and thereafter properties of the resulting vulcanizates are measured to obtain results as shown in Tables 5–9.

TABLE 3

| Milling stages | Compounding recipe | | A | B | C | D | E |
|---|---|---|---|---|---|---|---|
| First stage | Rubber component | oil-extended type SBR | 137.5 | | | 137.5 | |
| | | SBR | | 100 | 100 | | |
| | | BR | | | | | 70 |
| | | natural rubber | | | | | 30 |
| | N339 *1 | | 60 | 40 | | 30 | 40 |
| | Nipsil AQ *2 | | | | | 30 | |
| | inorganic filler | | 30 | 20 | 50 | 30 | 20 |
| | aromatic oil | | | 10 | 10 | | 10 |
| | stearic acid | | 2 | 2 | 2 | 2 | 2 |
| | 6C *3 | | 1 | 1 | 1 | 1 | 1 |
| | Si69 *4 | | | | | 3 | 1 |
| Second stage | zinc white | | 3 | 3 | 3 | 3 | 3 |
| | DPG *5 | | 0.5 | 0.5 | 1.2 | 0.8 | 0.5 |
| | DM *6 | | 0.7 | 0.7 | 1.5 | 1 | 0.7 |
| | NS *7 | | 0.7 | 0.7 | 1 | 1 | 0.7 |
| | sulfur | | 1.5 | 1.5 | 1.5 | 1.5 | 1.5 |

Unit: part by weight
*1: carbon black, Seast KH (trade mark, made by Tokai Carbon Co., Ltd.)
*2: silica (trade mark, made by Nippon Silica Industrial Co., Ltd.)
*3: antioxidant, N-(1,3-dimethylbutyl)-N'-phenyl-p-phenylene diamine
*4: silane coupling agent (trade mark, made by Degussa AG)
*5: vulcanization accelerator, diphenylguanidine
*6: vulcanization accelerator, dibenzothiazyl disulfide
*7: vulcanization accelerator, N-t-butyl-2-benzothiazyl sulfenamide

TABLE 4

| Chemical name | Maker | Trade mark | Average particle size (μm) |
|---|---|---|---|
| Aluminum hydroxide (gibbsite) | Showa Denko Co., Ltd. | Higilite H-43M | 0.6 |
| Alumina monohydrate (bochmite) | Kondea Japan Co., Ltd. | PURAL200 | 0.14 |
| γ-alumina | Baikowski | Baikalox CR125 | 0.3 |
| Kaolin clay | J. M. HUBER | Polyfil DL | 1.0 |
| Calcined clay | J. M. HUBER | Polyfil 40 | 1.2 |
| Magnesium hydroxide | Kyowa Kagaku Kogyo Co., Ltd. | Kisma 5A | 0.8 |
| Titanium oxide (anatase) | Ishihara Sangyo Co., Ltd. | Taipeke A-100 | 0.15 |

TABLE 5

| | Aluminum hydroxide (gibbsite) | | | | | | | | | |
|---|---|---|---|---|---|---|---|---|---|---|
| | Comparative Example | Example | | | | | | | | |
| Inorganic filler | 1 | 1 | 2 | 3 | 4 | 5 | 6 | 7 | 8 | 9 |
| Polymer | A | B | C | D | E | F | G | H | I | J |
| Tb | 20.1 | 21.7 | 21.4 | 21.3 | 21.6 | 21.0 | 21.4 | 20.9 | 21.1 | 22.1 |
| Wear resistance | 100 | 110 | 109 | 108 | 115 | 107 | 109 | 108 | 108 | 113 |

| | Alumina monohydrate (boehmite) | | | | | γ-alumina | | | | |
|---|---|---|---|---|---|---|---|---|---|---|
| | Comparative Example | Example | | | | Comparative Example | Example | | | |
| Inorganic filler | 2 | 10 | 11 | 12 | 13 | 3 | 14 | 15 | 16 | 17 |
| Polymer | A | B | C | E | G | A | B | C | E | G |
| Tb | 22.1 | 23.1 | 23.0 | 22.9 | 23.4 | 21.2 | 22.4 | 22.6 | 22.1 | 22.5 |
| Wear resistance | 100 | 109 | 108 | 112 | 107 | 100 | 107 | 107 | 110 | 108 |

| | Calcined clay | | | | | Kaolin | | | | |
|---|---|---|---|---|---|---|---|---|---|---|
| | Comparative Example | Example | | | | Comparative Example | Example | | | |
| Inorganic filler | 4 | 18 | 19 | 20 | 21 | 5 | 22 | 23 | 24 | 25 |
| Polymer | A | B | C | E | G | A | B | C | E | G |
| Tb | 21.5 | 22.6 | 22.3 | 22.3 | 22.4 | 21.5 | 22.6 | 22.3 | 22.3 | 22.4 |
| Wear resistance | 100 | 107 | 106 | 111 | 108 | 100 | 107 | 106 | 111 | 108 |

| | Magnesium hydroxide | | | | | Titanium oxide (anatase) | | | | |
|---|---|---|---|---|---|---|---|---|---|---|
| | Comparative Example | Example | | | | Comparative Example | Example | | | |
| Inorganic filler | 6 | 26 | 27 | 28 | 29 | 7 | 30 | 31 | 32 | 33 |
| Polymer | A | B | C | E | G | A | B | C | E | G |
| Tb | 20.9 | 22.6 | 22.4 | 22.2 | 22.5 | 22.5 | 23.4 | 23.4 | 23.5 | 24.1 |
| Wear resistance | 100 | 116 | 114 | 120 | 115 | 100 | 107 | 108 | 111 | 106 |

TABLE 6

| | Aluminum hydroxide (gibbsite) | | | | | Alumina monohydrate (boehmite) | | | | |
|---|---|---|---|---|---|---|---|---|---|---|
| | Comparative Example | Example | | | | Comparative Example | Example | | | |
| Inorganic filler | 8 | 34 | 35 | 36 | 37 | 9 | 38 | 39 | 40 | 41 |
| Polymer | K | L | M | N | O | K | L | M | N | O |
| Tb | 22.1 | 23.8 | 23.6 | 23.4 | 23.3 | 24.1 | 25.2 | 24.9 | 25.0 | 24.9 |
| Wear resistance | 100 | 115 | 113 | 118 | 113 | 100 | 109 | 110 | 114 | 109 |

| | γ-alumina | | | | | Calcined clay | | | | |
|---|---|---|---|---|---|---|---|---|---|---|
| | Comparative Example | Example | | | | Comparative Example | Example | | | |
| Inorganic filler | 10 | 42 | 43 | 44 | 45 | 11 | 46 | 47 | 48 | 49 |
| Polymer | K | L | M | N | O | K | L | M | N | O |
| Tb | 23.5 | 24.7 | 24.6 | 24.4 | 24.5 | 23.9 | 25.0 | 24.9 | 24.9 | 25.3 |
| Wear resistance | 100 | 108 | 107 | 111 | 107 | 100 | 109 | 108 | 113 | 109 |

| | Kaolin | | | | | Magnesium hydroxide | | | | |
|---|---|---|---|---|---|---|---|---|---|---|
| | Comparative Example | Example | | | | Comparative Example | Example | | | |
| Inorganic filler | 12 | 50 | 51 | 52 | 53 | 13 | 54 | 55 | 56 | 57 |
| Polymer | K | L | M | N | O | K | L | M | N | O |
| Tb | 23.3 | 24.2 | 24.5 | 24.1 | 24.4 | 23.2 | 24.2 | 24.2 | 24.1 | 23.8 |
| Wear resistance | 100 | 110 | 109 | 114 | 110 | 100 | 120 | 119 | 126 | 118 |

| | Titanium oxide (anatase) | | | | |
|---|---|---|---|---|---|
| | Comparative Example | Example | | | |
| Inorganic filler | 14 | 58 | 59 | 60 | 61 |
| Polymer | K | L | M | N | O |
| Tb | 24.2 | 25.3 | 25.1 | 25.3 | 24.9 |
| Wear resistance | 100 | 108 | 107 | 112 | 107 |

TABLE 7

| | Aluminum hydroxide (gibbsite) | | | | | Alumina monohydrate (boehmite) | | | | |
|---|---|---|---|---|---|---|---|---|---|---|
| | Comparative Example | Example | | | | Comparative Example | Example | | | |
| Inorganic filler | 15 | 62 | 63 | 64 | 65 | 16 | 66 | 67 | 68 | 69 |
| Polymer | K | L | M | N | O | K | L | M | N | O |
| Tb | 9.1 | 12.0 | 12.1 | 11.8 | 11.7 | 11.9 | 14.1 | 14.3 | 13.7 | 14.0 |
| Wear resistance | 100 | 153 | 149 | 184 | 144 | 100 | 140 | 139 | 149 | 137 |

TABLE 8

|  | Aluminum hydroxide (gibbsite) | | | | | Alumina monohydrate (boehmite) | | | | |
| --- | --- | --- | --- | --- | --- | --- | --- | --- | --- | --- |
|  | Comparative Example | Example | | | | Comparative Example | Example | | | |
| Inorganic filler | 17 | 70 | 71 | 72 | 73 | 18 | 74 | 75 | 76 | 77 |
| Polymer | A | B | C | E | G | A | B | C | E | G |
| Tb | 21.7 | 23.0 | 22.9 | 22.5 | 23.1 | 24.1 | 25.1 | 25.2 | 24.9 | 25.1 |
| Wear resistance | 100 | 118 | 115 | 124 | 114 | 100 | 115 | 112 | 120 | 113 |
|  | γ-alumina | | | | | Calcined clay | | | | |
|  | Comparative Example | Example | | | | Comparative Example | Example | | | |
| Inorganic filler | 19 | 78 | 79 | 80 | 81 | 20 | 82 | 83 | 84 | 85 |
| Polymer | A | B | C | E | G | A | B | C | E | G |
| Tb | 22.8 | 23.9 | 24.1 | 23.8 | 24.0 | 22.7 | 24.2 | 24.0 | 23.8 | 24.0 |
| Wear resistance | 100 | 114 | 110 | 116 | 111 | 100 | 112 | 110 | 116 | 113 |

TABLE 9

|  | Aluminum hydroxide (gibbsite) | | | | | Alumina monohydrate (boehmite) | | | | |
| --- | --- | --- | --- | --- | --- | --- | --- | --- | --- | --- |
|  | Comparative Example | Example | | | | Comparative Example | Example | | | |
| Inorganic filler | 21 | 86 | 87 | 88 | 89 | 22 | 90 | 91 | 92 | 93 |
| Polymer | P | Q | R | S | T | P | Q | R | S | T |
| Tb | 18.6 | 20.2 | 19.9 | 19.7 | 20.0 | 20.4 | 21.5 | 21.5 | 21.1 | 21.4 |
| Wear resistance | 100 | 111 | 110 | 114 | 110 | 100 | 107 | 108 | 110 | 107 |

As seen from the above results, the dispersing effect of the inorganic filler and the reinforcing effect can be simultaneously provided by a synergistic effect of a condensation reaction with a hydroxyl group as a surface functional group of the inorganic filler and an interaction of a polar group existing in a molecule of a polymer to the inorganic filler.

According to the invention, rubber compositions simultaneously establishing excellent fracture properties and wear resistance can be provided by using a diene polymer having a polar group in its molecule as a rubber component and an inorganic filler.

What is claimed is:

1. A rubber composition comprising a diene polymer synthesized through an emulsion polymerization and having a polar group in its molecule as a rubber component and an inorganic filler represented by the following formula (I):

mM    (I)

wherein M is an oxide or a hydroxide of aluminum or magnesium and m is an integer of 1 to 5.

2. A rubber composition according to claim 1, wherein the polar group is at least one selected from the group consisting of hydroxyl group, alkoxysilyl group, epoxy group, carboxyl group, carbonyl group, oxycarbonyl group, sulfide group, disulfide group, sulfonyl group, sulfinyl group, thiocatonyl group, imino group, amino group, nitrile group, ammonium group, imido group, amido group, hydrazo group, azo group, diazo group, oxygen-containing heterocyclic group, nitrogen-containing heterocyclic group and sulfur-containing heterocyclic group.

3. A rubber composition according to claim 1, wherein the diene polymer having a polar group in its molecules is at least one of a polybutadiene based polymer; which is obtained by polymerizing mainly butadiene, and a butadiene aromatic vinyl compound copolymer, which is obtained by polymerizing mainly butadiene and an aromatic vinyl compound.

4. A rubber composition according to claim 1, wherein the polar group is introduced as a polar group-containing monomer.

5. A rubber composition according to claim 4, wherein the polar group-containing monomer is at least one selected from the group consisting of vinylpyridine, acrylonitrile, acrylic acid, methacrylic acid, acrylic acid ester and methacrylic acid ester.

6. A rubber composition according to claim 1, wherein the inorganic filler represented by the formula (I) is aluminum hydroxide, or magnesium hydroxide.

7. A rubber composition according to claim 1, wherein M in the formula (I) is aluminum.

* * * * *